United States Patent [19]

Barnes

[11] 3,947,541
[45] Mar. 30, 1976

[54] SUBJECTING MATERIALS TO HIGH PRESSURE

[75] Inventor: Douglas Charles Barnes, Esher, England

[73] Assignee: National Research Development Corporation, London, England

[22] Filed: May 30, 1974

[21] Appl. No.: 474,607

[52] U.S. Cl. ............ 264/332; 425/77; 425/DIG. 5; 425/DIG. 26
[51] Int. Cl.² ........................................ B30B 11/32
[58] Field of Search.......... 425/77, DIG. 5, DIG. 26; 264/332

[56] References Cited
UNITED STATES PATENTS

| | | | |
|---|---|---|---|
| 3,100,912 | 8/1963 | Lloyd et al. | 425/77 |
| 3,105,994 | 10/1963 | Gerard et al. | 425/DIG. 5 |
| 3,107,395 | 10/1963 | Bundy | 425/77 |
| 3,159,876 | 12/1964 | Hall | 425/77 |
| 3,182,353 | 5/1965 | Hall | 425/DIG. 5 |
| 3,231,935 | 2/1966 | Brayman | 425/77 |
| 3,249,753 | 5/1966 | Barnett et al. | 425/DIG. 26 |
| 3,271,502 | 9/1966 | Wentorf | 425/DIG. 26 |
| 3,300,200 | 1/1967 | Allan et al. | 425/DIG. 26 |
| 3,339,886 | 3/1966 | Tyrner | 425/DIG. 5 |
| 3,555,607 | 1/1971 | Epain et al. | 425/77 |

FOREIGN PATENTS OR APPLICATIONS

| | | | |
|---|---|---|---|
| 1,331,402 | 5/1963 | France | 425/DIG. 5 |
| 1,035,352 | 7/1958 | Germany | 425/DIG. 5 |

OTHER PUBLICATIONS

Kumazawa et al., article, "Guide Blocks and Compressible Pads for the Practical Operation of Multiple-Anvil Sliding System for the Production of High Pressure," in *High Temperatures—High Pressures*, 1972, Vol. 4, pp. 293–310.

Primary Examiner—J. Howard Flint, Jr.
Attorney, Agent, or Firm—Cushman, Darby & Cushman

[57] ABSTRACT

Method and Apparatus for subjecting material to extreme compression, for instance in the making of artificial diamonds. The material is enclosed within a cluster of anvils. When pressure pads converge to bear upon the clustered anvils so that they slide against each other and the cluster contracts, the material within is compressed. The reaction of each anvil with its pressure pad is directed generally towards the material to be compressed but lies out-of-parallel with the interfaces of sliding movement of that anvil with its neighbours. The pad-anvil reaction can thus be resolved into components urging each anvil into contact with its neighbours, and thus supporting the anvil against fracture due to the high compression it undergoes along the pad-specimen axis.

6 Claims, 6 Drawing Figures

SUBJECTING MATERIALS TO HIGH PRESSURE

This invention relates to apparatus to subject material to high pressure, especially apparatus in which carbonaceous material may be subjected to very high pressures, of the order of 70 kilobars for example, to produce diamonds artificially or synthetically. In particular it relates to such apparatus in which similar anvils are arranged in face-to-face contact with each other in a cluster enclosing a specimen of the material with which they are also in contact. By sliding the anvils over each other so that the cluster tends to contract in size, the specimen enclosed within is compressed.

One such apparatus already proposed comprises anvils in the form of six identical rectangular blocks which are driven by two coaxial pressure pads and are arranged in a cluster around a cubic specimen of material. When the pads converge they bear against the anvils which slide against each other so as to contract the cluster and compress the specimen, thus tending to reduce it in size equi-dimensionally so that the volume diminishes although its surface shape always remains geometrically similar to the original. In better-known apparatus of the same general kind, specimens have been held in the slab-like space between the fixed and opposed parallel faces of two massive supports, and anvils sliding within that space have reduced the dimensions of the specimen along all axes lying at right-angles to the dimension between the two faces, but have left that dimension unchanged.

In apparatus of this kind, the anvils themselves are of course subject to great compression. Now the tendency of a body to fracture when subjected to compression along one axis can be resisted by applying compensating compression, commonly referred to as "massive support", to the body in the plane lying normal to that axis. This counteracts the tendency of the body to expand in that plane past its elastic limit. In apparatus of the kind described, the anvils have derived some such compensating compression from the normal reaction of the friction they set up as they slide against adjacent anvils. However, this compensating compression has seldom been substantial since the forces urging adjacent sliding anvils into contact with each other have not been great. Constructions have been proposed in which spacers fill some of the gaps between the anvil cluster and the pressure pads, but such spacers have been of compressible or resilient material, and their main purpose has apparently been to simplify the setting up of the apparatus. They have been ill-suited to withstanding the high working pressures of the apparatus, and thus incapable of creating predictable new compressive forces within the cluster, which could usefully provide "massive-support" for individual anvils.

The present invention arises from a search for new ways of making anvils more resistant to fracture, and from the resulting discovery that improvement is achieved if the reaction between each anvil and its thrust source lies out-of-parallel with the planes of sliding motion of that anvil against its neighbours, whereby that reaction may be resolved into components positively urging the mutually-sliding anvils into contact with each other. The invention includes new constructions of anvil, and new arrangements and constructions of pressure source to drive such anvils correctly.

The invention is defined by the claims at the end of this specification and will now be described, by way of example, with reference to the accompanying drawings in which:

Figure 1:
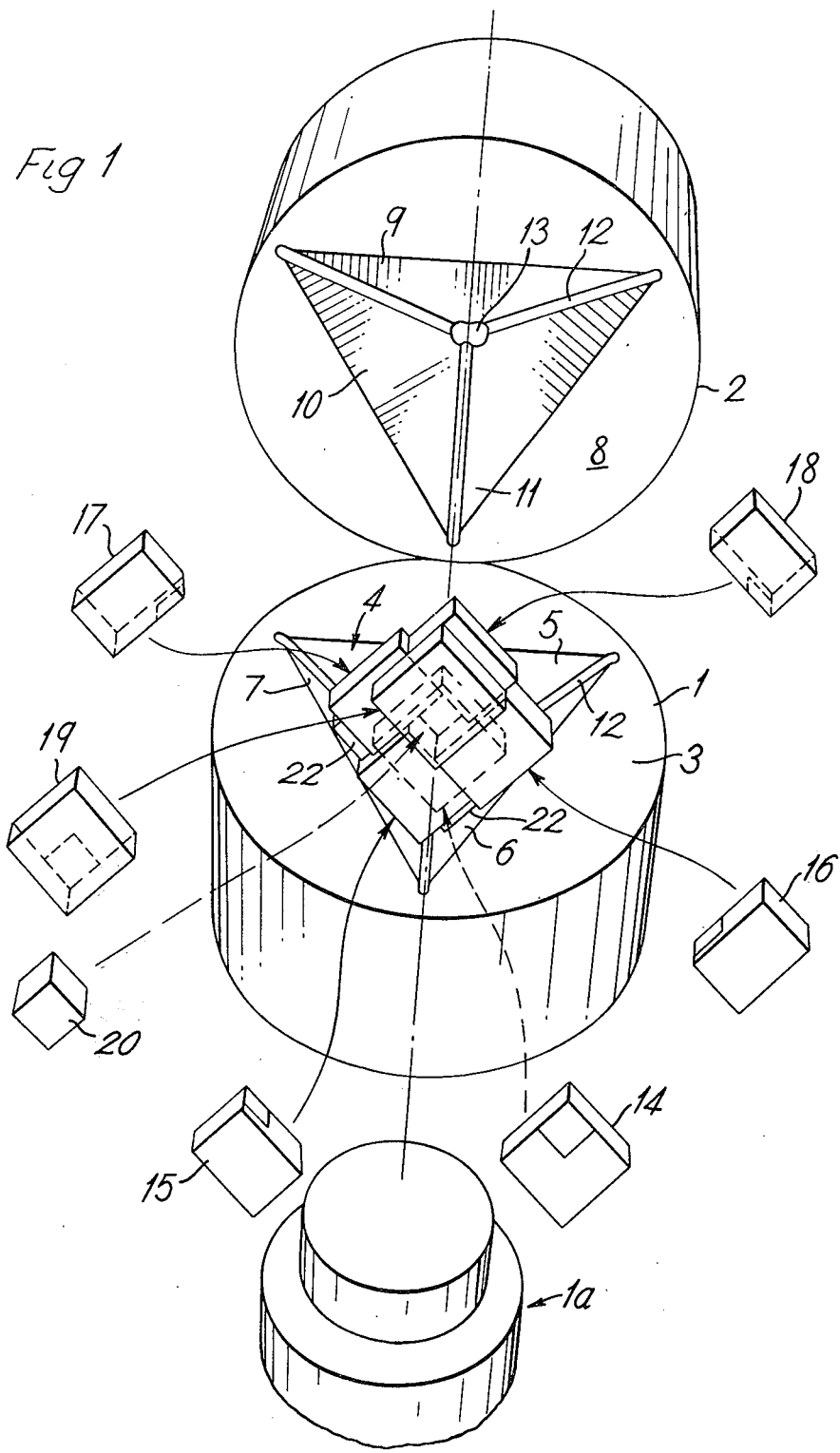
FIG. 1 is a perspective view, partly exploded, of apparatus already proposed.

FIG. 1 shows two cylindrical pressure pads 1 and 2. The pads are mounted on massive rams (the one for the lower pad is shown diagrammatically at 1a) which drive the pads axially towards each other and also prevent them from mutually rotating. In FIG. 1 pad 1 is shown disposed on its working axis 21, but anvil 2 has been tipped back and its corresponding ram omitted for clarity of illustration. The working upper face 3 of lower pad 1 is formed with a cavity 4 having three sides 5, 6 and 7 mutually at right angles to each other. The cavity thus has the shape that might have been caused had the corner of a cube penetrated face 3; this shape will be referred to as a "cube corner" cavity. Consequently, sides 5, 6 and 7 of the cavity are each disposed at an angle of $\cot^{-1} \sqrt{2}$, i.e. about 35° 15′ 52″ to axis 21, and when viewed along that axis are symmetrically displaced at 120° to each other. The working lower face 8 of upper pad 2 is formed with a similar cavity having sides 9, 10 and 11. Small grooves 12 leading to an axial cavity 13 are also visible in the upper pad, and the lower pad has corresponding features, of which only parts of the grooves are visible in FIG. 1. When pad 2 is placed co-axially above pad 1, faces 5, 9; 6, 10; 7, 11 lie parallel.

A cluster of six rectangular anvils 14 - 19 is shown formed and seated within cavity 4. Each anvil has two equal major square faces and four equal minor rectangular faces, and the anvils are so arranged as to enclose in the middle a cubic specimen 20 of material for compression. In the manufacture of synthetic diamonds, such material could be a graphite particle enclosed within a block of low-friction material such as pyrophyllite. The six anvils are shown in exploded perspective as well as in their working positions in FIG. 1, and in the exploded views a small square at one corner of one of the major square faces of each anvil indicates that part of the anvil which will directly contact the specimen 20 during operation. The opposite major square face of each anvil will be in contact with one of the pad cavity faces 5 - 7 and 9 - 11; thus anvil 14 will be in contact with face 5, 15 with 7, 16 with 6, 17 with 10, 18 with 11 and 19 with 9. As the pads are driven together axially by the rams during operation, they force the anvils into convergence so as to compress the specimen into a smaller cube. The movement of each anvil relative to the specimen will be parallel to one of the rectangular axes of the specimen. Resilient spacers 22, which are of relatively negligible strength and of which two only are visible in FIG. 1, may be used simply to set the anvils in their correct clustered position within cavity 4 before pad 2 is superimposed; they do not substantially affect the subsequent compression operation.

It will be apparent that once operation of the apparatus shown in FIG. 1 begins, each anvil 14 – 19 will be put under compression across those parts of its two major square faces that lie within the projected area of the small square, ie. of the area of contact between each anvil and the specimen 20. However, only the slight friction of the anvils rubbing against each other, as the specimen contracts in size, will put those anvils under any substantial compression across either of their opposed pairs of minor, rectangular faces.

Apparatus similar to that shown in FIG. 1 is also disclosed in an article by M. Kumazawa et al. in "High Temperatures — High Pressures", 1972, Vol. 4., page 293–310, especially FIG. 12 on page 302. Although these two constructions have many differences that are not relevant to the present invention, both share the feature that the principal loading force of the pressure pads upon each anvil acts on it in a direction parallel to the planes of the sliding movement of that anvil against adjacent anvils during the compression of the specimen. Thus those forces result in no substantial component of force urging each anvil into contact with its neighbour in a direction lying normal to those in which either anvil moves to compress the specimen. According to the present invention it is argued that lack of such normal force deprives the anvils of the "massive support" that would help them to resist fracture due to the high compression they have to withstand along the axis of their ordinary working movement; the present invention shows also how to remedy this deficiency.

Figure 2:
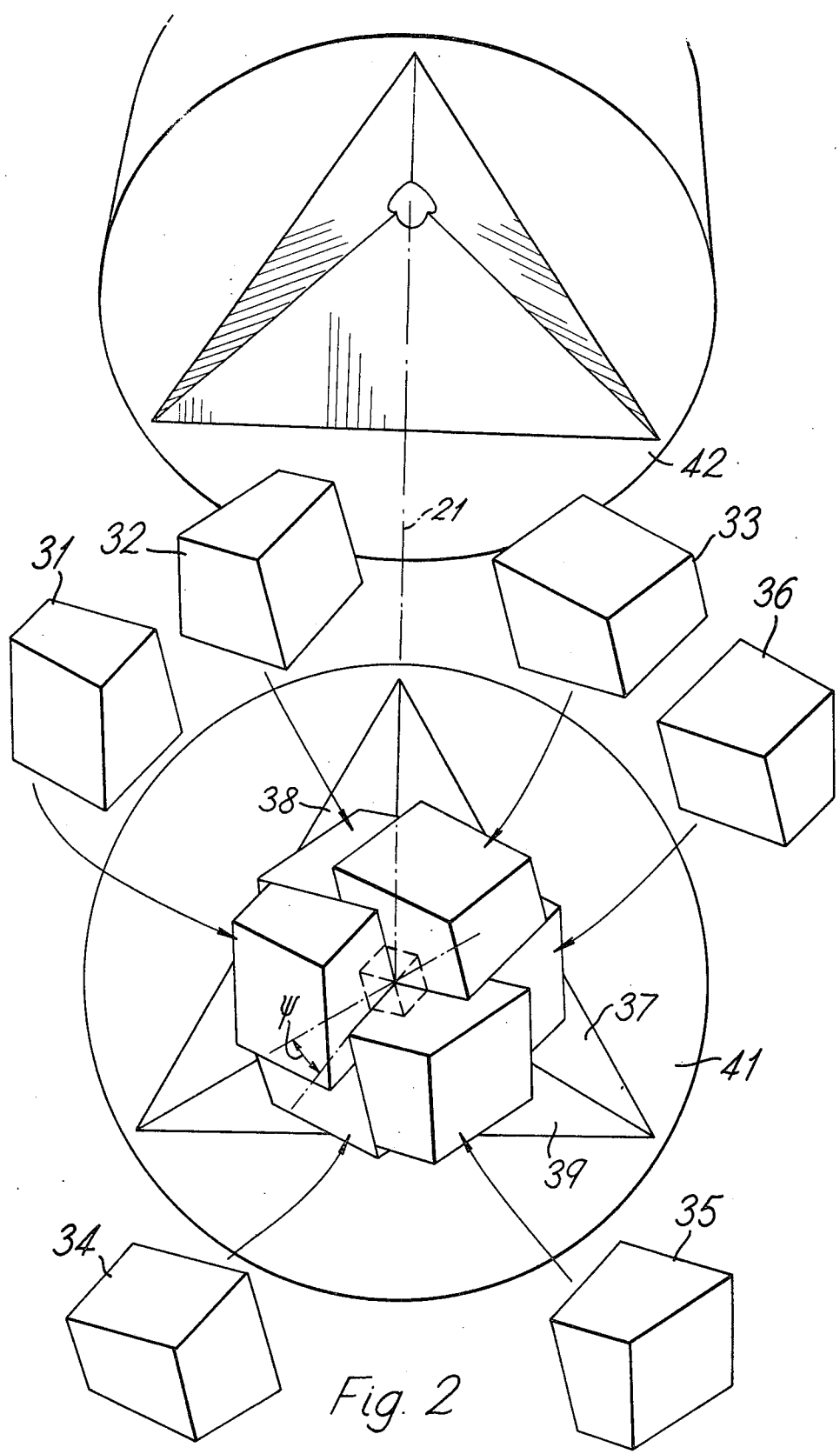
FIG. 2 is a similar view, but basically in plan, of apparatus according to the present invention.

FIG. 2 shows typical apparatus according to the present invention, in which the six rectangular blocks 14 – 19 of FIG. 1 are replaced by six blocks 31 – 36 that are similar except that their pad-contacting faces are angled obliquely to all the others. The mounting and general operation of pads 41 and 42 is similar to that of pads 1 and 2, but the mutual angles of the sides of the cavities in the working faces of the two pads may be different, as will be explained. It should also be observed that whereas in the known arrangement of FIG. 1, all the edges of the specimen 20 lay parallel to one of the radii corresponding to the grooves 12 separating the sides of the cavities, now each of the specimen, when viewed in plan, makes the same acute angle to the radius with which it is most nearly parallel, and correspondingly greater angles with the other two radii. The acute angle has been marked $\Psi$, and will be further explained later. The way in which the innermost square faces of the anvils make contact with the specimen, at one corner, is precisely similar to what was shown in FIG. 1. Furthermore, also as in the arrangement of FIG. 1, the specimen 20 lies so that one of its major diagonals coincides with the axis 21 of the pads; this means that one diagonal of each outer face of the specimen is always horizontal if (as is likely) the axis 21 is vertical.

Figure 3:
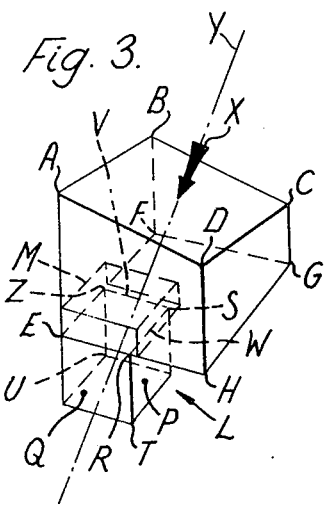
FIG. 3 is a perspective view of one anvil according to the present invention, showing it in working engagement with the specimen of material to be compressed.
Figure 6:
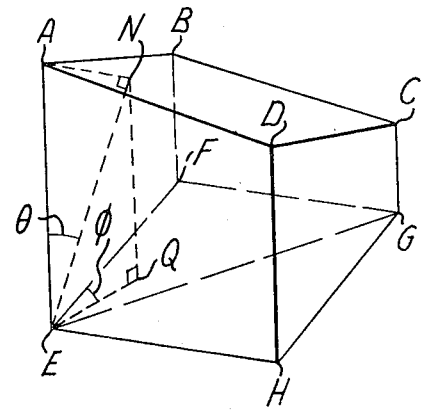
FIG. 6 is a geometrical diagram of an anvil, illustrating some important angles.

FIG. 3 shows diagrammatically a typical anvil for apparatus as shown in FIG. 2, with an angled face ABCD to make contact with the pressure pad and an opposite square face EFGH which lies normal to the parallel shorter edges AE, BF, CG and DH and which bears against the specimen L either directly, or (as shown) indirectly through a pad M of specially hard-wearing and highly compressive material recessed into the corner of face EFGH adjacent the vertex E. Of the four parallel shorter edges AE is the longest, BF and DH are equal and are next, and CG is the smallest. FIG. 6 shows a geometrical construction in which a line EN is drawn normal to plane ABCD, meeting that plane at N; the angle between lines AE and NE, i.e. angle AEN, which effectively indicates the angle between planes ABCD and EFGH, will henceforth be referred to as $\theta$. FIG. 6 also shows a line NQ, drawn perpendicular to plane EFGH and meeting it at Q. If BF equals DH, it is clear that Q will lie on diagonal EG and the angles between line EQ and edges EF, EH will both equal 45°. However, if BF is not equal to DH, EQ will not coincide with EG and one of angles QEF and QEH will be greater than the other. The angle QEF will henceforth be referred to as $\phi$.

To assemble such anvils and the specimens within the apparatus, the lower pressure pad is first set up on its ram, coxial with axis 21. One anvil as in FIG. 3 is now taken, and the specimen L is placed against it, also as shown in FIG. 3. Since the components are typically quite small and therefore of slight weight — each side of the cubic specimen may for instance be less than ½ in. long and a side of face EFGH about 1 in. long — assembly can be made easier by being performed within the cavity of pad 41, and using resilient setting-up spacer pads like items 22 in FIG. 1.

Next, a second anvil is put in contact with the specimen so that the anvil face corresponding to EFGH lies against specimen face P, with the vertex corresponding to E aligned with specimen vertex S. Next, a third anvil is added to the assembly so that the face corresponding to EFGH lies against specimen face Q and the vertex corresponding to E is aligned with specimen vertex T. This assembly of the specimen and three anvils should now lie in the cavity of pad 41 so that of the vertices of the specimen R is downmost and U is uppermost, specimen diagonal RU coinciding with axis 21; provided the cavity faces lie at the correct angle (which will be explained) to axis 21, the oblique faces (ABCD) of the three anvils will now each lie flush against one of the cavity faces 37 – 39, and the three assembled anvils will correspond to anvils 32, 34 and 36 in FIG. 2. To complete the assembly of the apparatus, three further anvils corresponding to 31, 33 and 35 of FIG. 2 are now added to abut the three remaining exposed faces of the specimen, the upper anvil 42 is superimposed, and the ram of the upper anvil descends down axis 21 until it connects with the back face of the upper pad. Further convergence of the pads without mutual rotation along that axis now causes each of the six anvils to move symmetrically towards axis 21, the pattern of this movement being such that each of the shorter edges AE, BF, CG and DH of each anvil remains parallel to its original direction. The centre of the specimen does not change position, RU remains coincident with axis 21, the outer shape remains that of a cube, but the edges of the specimen progressively shorten and shift position to maintain their alignment with the adjacent edges (EA, EF and EH) of each of the anvils.

Figure 4:
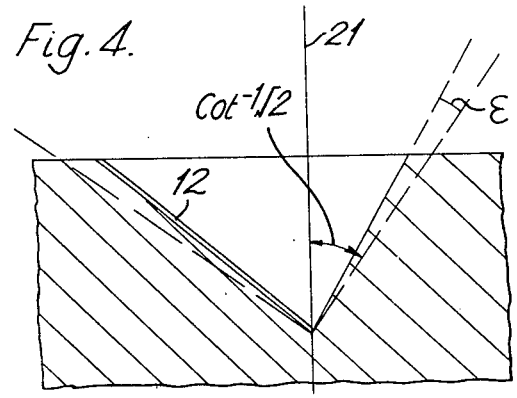
FIG. 4 is a diagrammatic axial section through a pressure pad for use with the anvil of FIG. 3.

It has already been noted that when the specimen is cubic and the anvils rectangular, as in FIG. 1, the cavity formed in the working face of each of the pressure pads is a "cube corner" hollow, in which the vertex of the cube coincides with the axis 21 and each face lies at an angle of $\cot^{-1} \sqrt{2}$ to the axis. It is part of the present invention that when symmetrically angled anvils are used, as shown in FIG. 3, with $\theta$ finite and $\phi = 45°$, the corresponding cavity in each pressure pad cannot be a cube corner hollow. Each cavity face must now be inclined to the axis 21 at a specific angle equal to Co- $t^{-1} \sqrt{2} - \epsilon$, as shown in FIG. 4, and the deviation $\epsilon$ is related to angle $\theta$ by the following formula:

$$\epsilon = \cos^{-1}\left(\frac{1}{\sqrt{3}} \cos\theta\right) - \cos^{-1}\left(\frac{1}{\sqrt{3}}\right)$$

By a corresponding analysis it may be shown that the angle $\Psi$, already explained, can be found from the formula:

$$\cos\psi = \frac{\cos\theta}{\left[1 + \frac{1}{2}\sin^2\theta\right]^{\frac{1}{2}}}$$

Figure 5:
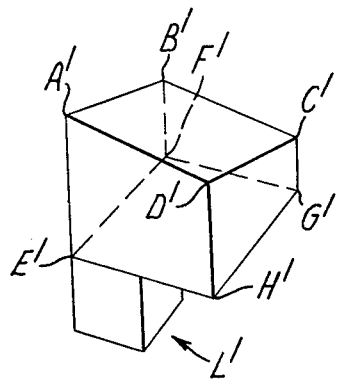
FIG. 5 is a similar to FIG. 3, but shows another anvil according to the present invention.

FIG. 5 is similar to FIG. 3, but shows an alternative anvil according to the present invention; the references A', B' etc. correspond to A, B etc. in the former figure. The vital difference between the anvils of FIGS. 3 and 5 is that in FIG. 3 BF equals DH, whereas in FIG. 5 edges B'F' and D'H' are unequal. In the typical case shown in that figure the lengths of edges A'E', D'H', B'F' and C'G' are all unequal and descend in that order, but constructions are possible in which the greater of D'H' and B'F' is greater than A'E'. EQ will no longer coincide with EG, and angle QE'F'=$\phi$ will be less than 45°.

Assembly of apparatus comprising anvils as shown in FIG. 5 proceeds as described already with reference to FIG. 3, except that when registering the first anvil with the specimen, care should now be taken that edges D'H' and B'F' are so arranged that when the anvil is eventually located within its appropriate cavity, the longer edge D'H' lies closer to the apex of the cavity than the shorter edge. The significance of this will be explained later.

The invention has involved the discovery that if the anvil is to be of the less symmetrical kind shown in FIG. 5, the angle $\epsilon$ illustrated in FIG. 4 is related to both $\theta$ and $\phi$ and may be found from the more general formula:

$$\epsilon = \cos^{-1}\left[\frac{1}{\sqrt{3}}\left(\cos\theta - \sin\theta(\cos\phi - \sin\phi)\right)\right] - \cos^{-1}\left(\frac{1}{\sqrt{3}}\right)$$

One striking difference between the anvils of FIGS. 3 and 5 is that whereas the former will never fit "cube corner" cavities the latter will, provided $\theta$ and $\phi$ are related by the formula:

$$\cos\theta - \sin\theta (\cos\phi - \sin\phi) = 1$$

In this more general case where $\phi$ has a value other than 45°, the angle $\psi$ can be found from the formula:

$$\cos\psi = \frac{3\cos\theta - 1}{2[1 + \cos^2\theta - \cos\theta + \sin^2\theta \sin\phi \cos\phi]^{1/2}}$$

which, as will be apparent, it a more generalised version of formula (ii) given above.

When the appropriate pressure pad face bears against the inclined face ABCD of the anvil shown in FIG. 3, the resultant reaction X between them may be taken to lie perpendicular to that face and to pass through its centroid. The line of action Y of this force is clearly out-of-parallel with all the other faces of the anvil. As shown in FIG. 3, by choosing suitable block proportions this line of action may pass approximately through the centre of the specimen L. This ability of the line of action to pass through the centre of the specimen may have clear advantages. Thus it tends to lead to pad-anvil contact in which the pad load is distributed more evenly over face ABCD, so permitting a higher total load. It may also lead to greater efficiency in the transfer of the pad-anvil load to the specimen, to a lesser tendency for the pads to rotate relative to each other about axis 21 when load is applied, and for the anvils to tilt relative to their pads and for their edges in consequence to dig into the pad faces. This dangerous tendency leads to a considerable effective loss in the surface area of the contact between anvil and pad, and to a great increase in resistance to the sliding of the anvils over the pads. Some sliding is necessary as the size of the anvil cluster diminishes diving compaction of the specimen. Another advantage of the reaction line Y passing through the opposite (EFGH) face of the anvil at a point within the projected area of the specimen is the avoidance of a tendency of the anvil to pivot about edges V or W of the specimen, with a consequent tendency of the anvil to fracture along those lines. A further advantage of the angled reaction between face ABCD and the appropriate pressure pad face is the fact that the force of reaction can be resolved into components normal to faces ADHE and ABFE. If the anvil of FIG. 3 is considered in the position of anvil 31 in FIG. 2, it will be seen that the force normal to face ADHE urges anvil 31 into contact with the specimen-contacting face of anvil 35, the opposite (angled) face of which is of course restrained from similar movement by contact with a face of the cavity in pressure pad 42. Likewise the force normal to face ABFE urges block 31 into contact with the square face of anvil 34. Thus anvils 34 and 35 give "massive support " to anvil 31 by forces with substantial components lying in two directions, mutually at right angles and both of them generally at right angles to the main force that anvil 31 exerts on the specimen. A similar analysis, of course, could be applied to all other anvils in the cluster.

With the anvil shown in FIG. 5, the more complex angling of face A'B'C'D' to E'F'G'H' leads, as we have seen, to the possibility of being able to accommodate the anvil cluster within "cube corner" cavities in the pressure pads. It also means that although it is possible and practically likely that the resultant pad reaction against face A'B'C'D' will indeed pass through the specimen, it will not pass through the centre of it. However, this extra degree of angling which additionally allows cavities to be shallower or steeper than a corner cube hollow, i.e. having a negative or positive value of $\epsilon$, affords the opportunity to adopt different mechanical advantages. The steeper the cavity, the greater the specimen contraction achieved by unit convergence of the pads. The arrangement of anvils described on p.11, lines 14 – 21, is appropriate to a cavity where $\epsilon$ is positive.

It is of course possible to convert cube corner cavities to those of different angle, as may be required by anvils of the type shown in FIG. 3, by resting wedge-shaped slippers against the cavity faces, and this may indeed have other advantages since the slippers could be of specially hard-wearing material preferably with low friction characteristics. Likewise the angled faces (ABCD, etc.) of the anvils could be provided by wedge-shaped caps, anchored to the rear faces of ordinary rectangular blocks as shown in FIG. 1.

Although the invention has been described with reference only to a cubic specimen, it applies generally to specimens of parallelepipedal shape. Naturally the geometry of the pads and anvils would have to be modified to accept a non-cubic parallelepipedal specimen and reduce it equi-dimensionally so that it always remains geometrically similar in shape to the original.

Notwithstanding the obvious advantages of applying the necessary forces to the anvils by way of only two pads, the invention also includes apparatus in which more than two force-applying members are used. For example, an individual piston might bear against each anvil, and a framework or some other means independent of the pistons might be used to guide the movement of the anvils.

We claim:

1. Apparatus to subject materials to high pressure comprising:
    pressure sources mounted to converge upon a space and presenting working faces; a plurality of similar and movable anvils arrangeable in a cluster within this space;
    the cluster completely defining an enclosed parallelepipedal volume to be filled by the material to be compressed; each anvil having side faces and opposed end faces; part of a first of the opposed end faces of each anvil defining a face of the enclosed parallelepipedal volume; the second and opposite end face of each anvil being in sliding contact with one of said working faces, whereby it may be acted upon by one of the pressure sources;
    a plurality of the side faces of each anvil being in sliding contact with faces of adjacent anvils in the cluster, whereby the anvils by mutual sliding movement may converge upon the volume and reduce it by the same proportion in each of its linear dimensions, and the line of action of the resultant force of each anvil against its working face lying oblique to the planes of sliding motion of that anvil against adjacent anvils, whereby that force may be resolved into components urging that anvil into contact with the said adjacent anvils.

2. Apparatus according to claim 1 in which:
    The first end face and the sliding faces of each anvil are plane faces lying mutually at right-angles to each other, and the second end face is a plane face lying out-of parallel with the first end face and the sliding side faces.

3. Apparatus according to claim 2 in which the first end face of each anvil is square.

4. Apparatus according to claim 2 comprising six anvils and in which the pressure sources comprise two pressure pads mounted to converge along a common axis, the converging face of each pad presenting a cavity with three plane faces, each of which faces registers with the second end face of a separate anvil, in which each cavity face is inclined to the axis of convergence at an angle:

$$-\cot^{-1} \sqrt{2} - \epsilon$$

and in which the equation:

$$\epsilon = \cos^{-1}\left[\frac{1}{\sqrt{3}}\left(\cos\theta - \sin\theta(\cos\phi - \sin\phi)\right)\right] - \cos^{-1}\left(\frac{1}{\sqrt{3}}\right)$$

is fulfilled, $\theta$ and $\phi$ being angles defined in the specification.

5. Apparatus according to claim 4 in which $\epsilon$ is zero, and the equation:

$$\cos\theta - \sin\theta(\cos\phi - \sin\phi) = 1$$

is fulfilled.

6. A method of compressing a parallelepidal specimen of material comprising the following steps:
    surrounding the specimen with six similar anvils, so that a first end face of each anvil abuts a different face of the specimen and a second and opposite end face of each anvil in inclined to the first end face;
    causing said cluster of anvils to contract, so compressing the specimen, by compressing said cluster in turn between two converging pressure sources, each said source having three working faces and each said working face bearing slidingly upon the said opposite end face of a different anvil; and
    causing each said anvil to slide over adjacent anvils as it moves to compress said specimen upon contraction of said cluster for setting up a resultant reaction of each anvil against its working face that lies oblique to the directions of sliding motion of that anvil against adjacent anvils.

* * * * *